US011582842B2

(12) United States Patent
Chen et al.

(10) Patent No.: US 11,582,842 B2
(45) Date of Patent: Feb. 14, 2023

(54) MICROWAVE COOKING DEVICE, CONTROL METHOD, AND STORAGE MEDIUM

(71) Applicants: Guangdong Midea Kitchen Appliances Manufacturing Co., Ltd., Guangdong (CN); Midea Group Co., Ltd., Guangdong (CN)

(72) Inventors: Likang Chen, Guangdong (CN); Xiangwei Tang, Guangdong (CN); Tianhong Wu, Guangdong (CN); Yang Deng, Guangdong (CN); Maoshun Chen, Guangdong (CN); Zonglong Chen, Guangdong (CN); Youping Fang, Guangdong (CN)

(73) Assignees: Guangdong Midea Kitchen Appliances Manufacturing Co., Ltd., Guangdong (CN); Midea Group Co., Ltd., Guangdong (CN)

( * ) Notice: Subject to any disclaimer, the term of this patent is extended or adjusted under 35 U.S.C. 154(b) by 228 days.

(21) Appl. No.: 16/652,394

(22) PCT Filed: Jan. 31, 2019

(86) PCT No.: PCT/CN2019/074235
§ 371 (c)(1),
(2) Date: Mar. 30, 2020

(87) PCT Pub. No.: WO2019/149252
PCT Pub. Date: Aug. 8, 2019

(65) Prior Publication Data
US 2020/0367327 A1     Nov. 19, 2020

(30) Foreign Application Priority Data

Jan. 31, 2018 (CN) .......................... 201810096705.6
Feb. 5, 2018 (CN) .......................... 201810110876.X

(51) Int. Cl.
*H05B 6/68* (2006.01)

(52) U.S. Cl.
CPC ............. *H05B 6/686* (2013.01); *H05B 6/681* (2013.01)

(58) Field of Classification Search
CPC .................... H05B 6/686; H05B 6/681; H05B 2206/044; H05B 6/70; Y02B 40/00
See application file for complete search history.

(56) References Cited

U.S. PATENT DOCUMENTS 8,530,807 B2 *   9/2013   Niklasson .............. H05B 6/688
                                                                  219/678
2011/0297672 A1 *  12/2011  Niklasson ............ H05B 6/6447
                                                                  219/702
(Continued)

FOREIGN PATENT DOCUMENTS

CN         101841948 A      9/2010
CN         204887520 U     12/2015
(Continued)

*Primary Examiner* — Benjamin Tzu-Hung Liu
(74) *Attorney, Agent, or Firm* — Seed IP Law Group LLP

(57) ABSTRACT

The present disclosure provides a microwave cooking apparatus, a control method, and a storage medium. The microwave cooking apparatus comprises: a housing capable of enclosing a heating chamber therein; a solid microwave source disposed on the housing and used for emitting a first variable-power microwave; an antenna connected to the solid microwave source and used for feeding the first variable-power microwave into the heating chamber; and a controller connected to the solid microwave source and used for controlling the solid microwave source to operate and adjusting the first variable-power microwave. According to the technical solution of the present disclosure, on one hand, a better heating effect is able to be achieved for sealed foods, and on the other hand, a better unfreezing effect is also able to be achieved because the power of a solid microwave (Continued)

source is much lower than that of a magnetron so that during an unfreezing operation, foods to be defrosted will not be locally cooked resulting from local overheating caused when the foods to be defrosted locally absorbs too much heat due to excessive power.

19 Claims, 6 Drawing Sheets

(56) References Cited

U.S. PATENT DOCUMENTS

| | | | |
|---|---|---|---|
| 2012/0097669 | A1 | 4/2012 | Sim et al. |
| 2015/0271877 | A1* | 9/2015 | Johansson .............. H05B 6/686 219/750 |

FOREIGN PATENT DOCUMENTS

| | | |
|---|---|---|
| CN | 106413163 A | 2/2017 |
| CN | 106949507 A | 7/2017 |
| CN | 107559903 A | 1/2018 |
| CN | 108337757 A | 7/2018 |
| CN | 108337758 A | 7/2018 |
| EP | 2326141 A1 | 5/2011 |
| JP | 49-97442 U | 8/1974 |
| JP | 50-45356 A | 4/1975 |
| JP | 55-35485 A | 3/1980 |
| JP | 60-262385 A | 12/1985 |
| JP | 61-27093 A | 2/1986 |
| JP | 2003-269728 A | 9/2003 |
| JP | 2008-261530 A | 10/2008 |
| JP | 2008-269794 A | 11/2008 |
| JP | 2010-73382 A | 4/2010 |
| JP | 201092751 A | 4/2010 |

* cited by examiner

MICROWAVE COOKING DEVICE, CONTROL METHOD, AND STORAGE MEDIUM

CROSS-REFERENCES TO RELATED DISCLOSURE

The present disclosure claims priority to Chinese Patent Application No. 201810096705.6, entitled "Microwave Heating Device and Control Method", filed in the China National Intellectual Property Administration on Jan. 31, 2018, and to Chinese Patent Application No. 201810110876.X, entitled "Microwave Cooking apparatus, Control Method and Storage Medium", filed in the China National Intellectual Property Administration on Feb. 5, 2018, the entire contents of which are incorporated herein by reference.

TECHNICAL FIELD

The present disclosure relates to the field of household appliances, in particular to a microwave cooking apparatus, a control method and a computer readable storage medium.

BACKGROUND

At present, a microwave oven is more and more popular due to its convenience for heating, the needs to be satisfied by the microwave oven are also more and more diversified, a plurality of combined heating modes such as microwave, steam, barbecue, hot air, defrosting and the like are correspondingly generated. The combined heating main stream solution is that all power components are directly superposed, for example, a magnetron and a steam generator are combined to form a micro-steaming oven, and the magnetron and the steam generator and a heating pipe are combined to form a micro-steaming oven. The magnetron is mainly used as a microwave source for existing microwave ovens, and although the magnetron is high in power, high in efficiency and low in cost, the magnetron has the following defects.

The microwave generated is not controlled, and the microwave power is able to be reduced only by limiting the current of a power supply, so that the heating effect is poor in combined heating with other power devices.

SUMMARY

The present disclosure aims to solve at least one of the technical problems existing in the prior art or the related art.

To this end, it is an object of the present disclosure to provide a new microwave cooking apparatus, which is able to realize a power-adjustable heating function by adding a solid microwave source and controlling the solid microwave source to replace a combination of a magnetron and other power components to generate a plurality of heating modes, thereby improving the heating effect.

It is another object of the present disclosure to correspondingly propose a control method and a computer-readable storage medium.

It is yet another object of the present disclosure to provide a new microwave cooking apparatus.

It is yet another object of the present disclosure to provide a control method accordingly.

To achieve at least one of the above objects, according to a first aspect of the present disclosure, provided is a microwave cooking apparatus including: a housing capable of enclosing a heating chamber therein; a solid microwave source disposed on the housing and used for emitting a first variable-power microwave; an antenna connected to the solid microwave source and used for feeding the first variable-power microwave into the heating chamber; and a controller connected to the solid microwave source and used for controlling the solid microwave source to operate and adjusting the first variable-power microwave.

According to the technical solution, the solid microwave source and the antenna used for transmitting the variable-power microwave emitted by the solid microwave source are disposed on the housing, compared with a magnetron heating mode, the solid microwave source has the characteristic that the microwave power is continuously adjustable relative to the magnetron, on one hand, a better heating effect is able to be achieved for sealed foods, and on the other hand, a better unfreezing effect is also able to be achieved because the power of a solid microwave source is much lower than that of a magnetron so that during an unfreezing operation, foods to be defrosted will not be locally cooked resulting from local overheating caused when the foods to be defrosted locally absorbs too much heat due to excessive power.

According to the technical solution, optionally, the microwave cooking apparatus further comprises: a magnetron disposed on the housing and used for emitting a second power microwave; a waveguide disposed corresponding to the magnetron and used for feeding the second power microwave into the heating chamber, wherein the controller is used for controlling the magnetron to operate or controlling the magnetron to operate synchronously with the solid microwave source.

According to the technical solution, the magnetron is controlled to operate through the controller, the function of a magnetron single heating mode is achieved, the magnetron and the solid microwave source are controlled to operate together, the microwave power generated by the combination of the magnetron and the solid microwave source is higher, and the microwave energy generated in the corresponding unit time is larger, so that the operating efficiency is able to be further improved compared with the mode of simply disposing the magnetron under the operating condition that high-power heating is required.

According to any of the above technical solutions, optionally, the microwave cooking apparatus further comprises: a steam generator disposed on the housing and used for conveying high-temperature steam to the heating chamber, wherein the controller is used for controlling the steam generator to operate or controlling the steam generator to operate synchronously with the solid microwave source.

According to the technical solution, the steam generator and the solid microwave source are controlled to operate synchronously, and compared with the steam generator and the magnetron operating simultaneously, the resonance characteristic of the heating chamber is able to be prevented from being changed because steam is condensed around the heating chamber caused by the unadjustable microwave frequency. Because the solid microwave source is able to arbitrarily adjust the emission frequency of the microwave source, the resonance point is able to be found again in the heating chamber where condensation occurs and operation is able to be carried out at the resonance point, so that the purpose of improving the microwave heating efficiency is achieved.

According to any of the above technical solutions, optionally, the microwave cooking apparatus further comprises: a heating pipe adhered and disposed on the housing and used for emitting high-temperature infrared rays, wherein the controller is used for controlling the heating pipe to operate or controlling the heating pipe to operate synchronously with the solid microwave source.

According to the technical solution, with the heating mode that the heating pipe and the solid microwave source operate synchronously being set, and compared with the heating mode in which the magnetron and the heating pipe are combined for heating in the prior art, because the power is lower, the microwave power is only 300 W at maximum, the metal frame is able to be placed in the heating chamber to serve as a grill, and sparking caused by high induction voltage generated on the metal frame due to too high microwave power is avoided. Therefore, the operating safety under the barbecue mode (heating pipe+solid microwave source) is improved.

According to any technical solution, optionally, the housing is of a cuboid structure; the solid microwave source and the antenna component are respectively disposed at the top of the housing; the magnetron is disposed at the rear part of the housing, and the waveguide is disposed below the magnetron and extends to the lower part of the housing; the steam generator is disposed on the side wall of the housing; and the heating pipe is disposed on the rear wall of the housing.

According to the technical solution, the solid microwave source, the magnetron, the steam generator and the heating pipe are respectively disposed in different areas of the housing, so that the reasonable configuration of the power component is realized, and the preparation size of the existing microwave cooking apparatus need not to be increased on the premise that the solid microwave source is increased.

In addition, the set position of the device is able to be adjusted according to adjustment of functions and operating modes.

According to any of the above technical solutions, optionally, the solid microwave source comprises: a signal source used for generating an original microwave signal; a preamplifier connected to the signal source and used for amplifying the original microwave signal into a low-power microwave signal; a power divider connected to the preamplifier and used for distributing the low-power microwave signal into a multi-path microwave signal; a power amplification tube connected to the power divider, wherein the power amplifier is used for amplifying power of the multi-path microwave signal to generate multi paths of first variable power microwaves; a radio frequency ejection device used for transmitting first variable power microwaves to the antenna, wherein the power variation range of the first variable power microwaves is greater than or equal to 0 watt and smaller than or equal to 300 watts.

According to the technical solution, the microwave power sent by the signal source is able to be adjusted by setting the signal source, the preamplifier, the power distributor and the power amplification tube respectively. The operating voltage is low, the safety is high, the antenna is fed into the heating chamber through the radio frequency ejection device, and the adjustable heating space is constructed, so that a rotating component is required to be disposed in the heating chamber, and the structure of the microwave cooking apparatus is facilitated to be simplified.

The power amplification tube is a GaN semiconductor power amplification tube.

According to a second aspect of the present disclosure, provided is a control method, comprising the following steps of: detecting the heating instruction for starting a single heating mode or a combined heating mode when a heating instruction is received; determining at least two groups of power components in the combined heating mode to start the at least two power components so as to carry out the heating operation when the heating instruction for starting the combined heating mode is detected, wherein the at least two groups of power components comprise solid microwave source components.

According to the technical solution, when a microwave heating instruction is received, firstly, the type of the microwave heating instruction is determined and is able to be divided according to a power device controlled to be started by the heating instruction as comprising a single heating mode and a combined heating mode. When the combined heating mode is determined, a power component corresponding to the combined heating mode is determined to control the microwave heating operation to be carried out between the starting powers. The solid microwave source has the characteristic that the microwave power is continuously adjustable relative to the magnetron, on one hand, a better heating effect is able to be achieved for sealed foods, and on the other hand, a better unfreezing effect is also able to be achieved because the power of a solid microwave source is much lower than that of a magnetron so that during an unfreezing operation, foods to be defrosted will not be locally cooked resulting from local overheating caused when the foods to be defrosted locally absorbs too much heat due to excessive power.

In addition, the type of the instruction may be divided according to the magnitude of the heating power.

According to the technical solution, optionally before the heating operation is performed, the following steps are further comprised: controlling the solid microwave source component to emit a fixed power detection signal into the heating chamber; receiving a reflection signal of the detection signal, and determining whether the heating chamber is unloaded or not according to the comparison of the magnitude of the reflection signal with a preset threshold value; generating an alarm signal when the heating chamber is determined to be unloaded; when it is determined that the heating chamber is loaded, executing the heating operation according to the heating instruction.

According to the technical solution, a small detection signal with a fixed power value is emitted to the heating chamber, then whether the magnitude of a reflection signal of the detection signal exceeds a preset threshold value or not is detected; whether the heating chamber is unloaded or not is determined, and the heating chamber is determined to be unloaded if the magnitude of the reflection signal of the detection signal exceeds the preset threshold value, vice versa. On one hand, the function of directly detecting no load through microwave signal is realized, and other detection devices do not need to be disposed, on the other hand, when no load is detected, an alarm signal is generated, so that the safety of the microwave cooking apparatus is improved.

Compared with the magnetron, the solid microwave source has the following advantages: (1) the microwave power is able to be accurately and stably emitted, the microwave power emitted by the magnetron is unstable (the size change is more than 10%) and (2) the microwave emitted by the magnetron is a space free wave, the returned power is unable to be accurately detected, the microwave emitted by the solid source is a guided wave, and the returned microwave power is able to be accurately detected.

Therefore, the unloaded detection function is able to be realized only by transmitting the detection signal through the solid microwave source.

In particular, in a heating chamber of a given size and shape, the microwave absorption rate is constant at no load and is at a minimum value, for example, the unloaded microwave absorption rate (loss) of the heating chamber is 4%, then 4% of the microwave power emitted by the microwave source is lost at no load, 96% of the microwave power is returned to the solid microwave source originally, and therefore a microwave detection signal with accurate power is emitted, for example, the power value is 100 W, and then the power value of the reflected signal reflected back is detected, and if it is greater than or equal to 96 W, it is determined to be unloaded, and if it is less than 96 W, it is determined to be loaded.

According to any of the above technical solutions, it is preferable that the combined heating mode includes any one of a combination of a solid microwave source and a magnetron, a combination of a solid microwave source and a steam generator, and a combination of a solid microwave source and a heating pipe.

According to the technical solution, the combined heating mode comprises at least three power component combinations.

The magnetron and the solid microwave source are controlled to operate together, the microwave power generated by the combination of the magnetron and the solid microwave source is higher, and the microwave energy generated in a corresponding unit time is larger, so that the operating efficiency is able to be further improved compared with the mode of simply disposing the magnetron under the operating condition that high-power heating is required.

By controlling the synchronous operation of the steam generator and the solid microwave source, and compared with the steam generator and the magnetron operating simultaneously, the resonance characteristic of the heating chamber is able to be prevented from being changed because steam is condensed around the heating chamber caused by the unadjustable microwave frequency. Because the solid microwave source is able to arbitrarily adjust the emission frequency of the microwave source, the resonance point is able to be found again in the heating chamber where condensation occurs and operation is able to be carried out at the resonance point, so that the purpose of improving the microwave heating efficiency is achieved.

According to the technical solution, with the heating mode that the heating pipe and the solid microwave source operate synchronously being set, and compared with the heating mode in which the magnetron and the heating pipe are combined for heating in the prior art, because the power is lower, the microwave power is only 300V at maximum, the metal frame is able to be placed in the heating chamber to serve as a grill, and sparking caused by high induction voltage generated on the metal frame due to too high microwave power is avoided. Therefore, the operating safety under the barbecue mode (heating pipe+solid microwave source) is improved.

According to any of the above technical solutions, optionally, the method further comprises: when a heating instruction used for starting a single heating mode is detected, determining a power component corresponding to the single heating mode so as to start the power component to carry out a heating operation, wherein the power component comprises any one of a solid microwave source, a magnetron, a steam generator and a heating pipe.

According to the technical solution, four single heating modes are set as follows: a solid microwave source heating mode, a magnetron heating mode, a steam heating mode and a heating pipe heating mode, wherein the magnetron heating mode is able to meet the high-power heating requirement, the solid microwave source heating mode is able to meet the unfreezing requirement, with the steam storage heating mode, high-temperature steam is able to be generated, the taste caused by heating errors is able to be improved, and the barbecue function is able to be realized by the heating pipe heating mode.

According to a third aspect of the present disclosure, provided is a microwave cooking apparatus comprising: a processor; a memory used for storing instructions executable by the processor, wherein the processor, when used to execute the executable instructions stored in the memory, carries out the steps of the control method according to any one of the above-described technical solutions of the first aspect.

According to a fourth aspect of the present disclosure, provided is a computer readable storage medium having stored thereon a computer program, when the computer program is executed by a processor, the steps of the control method according to any one of the above-mentioned technical solutions of the first aspect are implemented.

In order to achieve the above object, the technical solution of the fifth aspect of the present disclosure provides a microwave cooking apparatus, comprising: a cavity; a magnetron fixedly disposed on the side wall of the cavity and used for feeding a first microwave into the cavity, wherein the magnetron adjusts the power of the first microwave with a first power adjustment accuracy; and a semiconductor microwave source fixedly disposed on the side wall and used for feeding a second microwave into the cavity, adjusting the power of the second microwave with a second power adjustment accuracy, wherein the second power adjustment accuracy is higher than the first power adjustment accuracy.

According to the technical solution, the microwave cooking apparatus has two microwave sources, namely a magnetron and a semiconductor microwave source, and when the magnetron operates independently, the performance of the microwave cooking apparatus is similar to that of a traditional microwave cooking apparatus with a single magnetron. When the semiconductor microwave source operates independently, since the second power adjustment accuracy of the semiconductor microwave source is higher than the first power adjustment accuracy of the magnetron, that is, the minimum step value of the power of the second microwave is smaller than the minimum step value of the power of the first microwave, the power adjustment accuracy of the microwave cooking apparatus is higher, more power gears are able to be adjusted, and the microwave cooking apparatus is able to meet more heating requirements. When the magnetron and the semiconductor microwave source are operated at the same time, it can be understood that the overall power of the microwave cooking apparatus is the sum of the power of the first microwave and the power of the second microwave, and therefore, both the range of the overall power of the microwave cooking apparatus is able to be increased and the power adjustment accuracy of the microwave cooking apparatus is able to be improved with respect to the microwave cooking apparatus having only the magnetron. The whole power range and the power adjustment accuracy are improved, more heating gears are provided, appropriate heating gears are able to be adjusted according to different heating objects, different heating requirements are met, and the applicability is better.

On the premise that the second power adjustment accuracy is higher than the first power adjustment accuracy, the preferred value range of the second power adjustment accuracy is 1-10 W.

According to the technical solution, optionally, the first power range of the first microwave has a first minimum power and a first maximum power, and the second power range of the second microwave has a second minimum power and a second maximum power, and the second maximum power is between the first minimum power and the first maximum power.

According to the technical solution, the power range of the second microwave is from the second minimum power to the second maximum power. The first minimum power of the first microwave is set in the overall power range of the second microwave, so that the microwave cooking apparatus is able to realize adjustment from the second minimum power to the first maximum power, the overall power range of the microwave cooking apparatus is from the second minimum power to the sum of the first maximum power and the second maximum power, the overall power range of the microwave cooking apparatus is increased, and more heating requirements are able to be met.

Optionally, the second minimum power is 0 W.

Optionally, the power range of the second microwave is not less than the minimum step value of the first power adjustment accuracy to achieve continuous adjustment of the overall power of the microwave cooking apparatus with the second power adjustment accuracy over the overall power range of the microwave cooking apparatus.

According to the technical solution, optionally, the first frequency range of the first microwave and the second frequency range of the second microwave do not overlap.

According to the technical solution, the first frequency range of the first microwave and the second frequency range of the second microwave do not overlap, so that the possibility of mutual interference of the first microwave and the second microwave caused by operating the magnetron and the semiconductor microwave source simultaneously is able to be prevented, and the heating reliability of the microwave cooking apparatus is improved.

According to the technical solution, optionally, the apparatus further comprises a band-stop antenna fixedly disposed on the side wall and connected with the semiconductor microwave source so as to feed the second microwave into the cavity, and further used for shielding the second microwave in the first frequency range.

According to the technical solution, the second microwave generated by the semiconductor microwave source in the second frequency range is fed into the cavity through the band-stop antenna, and the second microwave in the first frequency range is shielded by the band-stop antenna, so that the possibility of mutual interference of the second microwave and the first microwave is reduced, and the heating reliability of the microwave cooking apparatus is improved.

According to the technical solution, optionally, the band-stop antenna specifically comprises: an antenna used for feeding the second microwave into the cavity; a filter connected with the antenna and used for shielding the second microwave in the first frequency range; or a circulator connected with the antenna, and used for shielding the second microwave in the first frequency range.

According to the technical solution, the band-stop antenna is an antenna and a filter connected with the antenna, or the band-stop antenna is an antenna and a circulator connected with the antenna; wherein the filter and the circulator are used for shielding the second microwaves in the first frequency range, namely only the second microwaves outside the first frequency range are able to pass through the filter and the circulator, and finally the second microwaves are fed into the cavity through the antenna, so that the possibility of mutual interference of the second microwaves and the first microwaves is reduced, and the heating reliability of the microwave cooking apparatus is improved.

According to the technical solution, optionally, the apparatus further comprises: a waveguide fixedly disposed on the side wall and connected with the magnetron to feed the first microwave into the cavity.

According to the technical solution, the first microwave generated by the magnetron is fed into the cavity through the waveguide, and the magnetron is able to be disposed on the outer wall of the cavity, so that the magnetron is convenient to overhaul.

The technical solution of the sixth aspect of the present disclosure provides a control method for a microwave cooking apparatus in any one of the technical solutions of the fifth aspect, comprising: acquiring a target power of the microwave cooking apparatus; determining the relationship between the magnitude of the target power and the magnitude of power parameter of the semiconductor microwave source and the magnetron in the microwave cooking apparatus to generate a determined result; according to the determined result, adjusting the first power of the magnetron with the first power adjustment accuracy, and adjusting the second power of the semiconductor microwave source with the second power adjustment accuracy, so that an overall power of the microwave cooking apparatus reaches the target power, wherein the overall power is the sum of the first power and the second power.

According to the technical solution, the overall power of the microwave oven is the sum of the first power of the magnetron and the second power of the semiconductor microwave source, and it is understood that the first power of the magnetron is the power of the first microwave and the second power of the semiconductor microwave source is the power of the second microwave. When the microwave cooking apparatus operates, after the target power of the microwave cooking apparatus is acquired, the magnitude of the target power is compared with those of the semiconductor microwave source and the magnetron in the microwave cooking apparatus, so that the first power and the second power are determined through the determined result, and the whole power is equal to the target power. The power parameter of the semi-magnetron comprises a first minimum power, a first maximum power and a first power adjustment accuracy of the first microwave, and the power parameter of the semiconductor microwave source comprises a second minimum power, a second maximum power and a second power adjustment accuracy of the second microwave. It will be appreciated that: when the accuracy of the target power is not higher than that of the first power adjustment accuracy, the first power of the magnetron is able to be adjusted with the first power adjustment accuracy, so that the accuracy of the whole power is matched with that of the target power, the second power of the semiconductor microwave source is able to be adjusted with the second power adjustment accuracy, so that the accuracy of the whole power is matched with that of the target power, and the first power and the second power are able to be adjusted simultaneously, so that the accuracy of the overall power is matched to the accuracy of the target power. When the accuracy of the target power is higher than the first power adjustment accuracy, the second power must be adjusted to make the overall power equal to the target power by adjusting the second power with the second power adjustment accuracy regardless of whether the magnetron operates or not. Meanwhile, according to the relation of the target power, the first maximum power and the second maximum power, sizes of the first power of the magnetron and the second power of the semiconductor microwave source are determined, so that the sum of the first power and the second power, namely the whole power of the microwave cooking apparatus reaches the target power.

According to the technical solution, optionally, according to the determined result, the first power of the magnetron is adjusted with the first power adjustment accuracy, and the second power of the semiconductor microwave source is adjusted with the second power adjustment accuracy, so that the overall power of the microwave cooking apparatus reaches the target power. And if the target power is not greater than the second maximum power of the semiconductor microwave source, the magnetron is turned off and the second power is adjusted to reach the target power with the second power adjustment accuracy.

According to the technical solution, when the target power is not greater than the second maximum power of the semiconductor microwave source, the whole power is able to be equal to the target power only by operating the semiconductor microwave source, so that the magnetron is turned off, the microwave source of the microwave cooking apparatus is the semiconductor microwave source, and the second power is adjusted to reach the target power with the second power adjustment accuracy, so that the whole power is equal to the target power. The independent operation of the semiconductor microwave source is able to not only increase the adjustment accuracy of the overall power of the microwave cooking apparatus, enable the microwave cooking apparatus to meet more heating requirements, but also simplify the power adjustment process of the microwave cooking apparatus, and facilitate the control of the microwave cooking apparatus. The semiconductor microwave source is able to gradually increase the overall power of the microwave cooking apparatus from 0 so as to increase the overall power range of the microwave cooking apparatus and increase the applicability of the microwave cooking apparatus.

According to the technical solution, optionally, according to the determined result, the first power of the magnetron is adjusted with the first power adjustment accuracy, and the second power of the semiconductor microwave source is adjusted with the second power adjustment accuracy, so that the overall power of the microwave cooking apparatus reaches the target power. If the target power is not less than the first maximum power of the magnetron, the first power is adjusted to reach the first maximum power, and the second power is adjusted with the second power adjustment accuracy so that the second power is the difference between the target power and the first maximum power.

According to the technical solution, when the target power is not less than the first maximum power of the magnetron, the first power of the magnetron is adjusted to reach the first maximum power, that is, the magnetron operates at the first maximum power, and then the second power, and the sum of the first power and the second power of the semiconductor microwave source is adjusted with the second power adjustment accuracy, that is, the total power is equal to the target power. Specifically, if the target power is equal to the first maximum power, the magnetron operates at the first maximum power, and the semiconductor microwave source does not operate; if the target power is greater than the first maximum power, the semiconductor microwave source operates while the magnetron operates at the first maximum power so that the second power is equal to the difference between the target power and the first maximum power.

According to the technical solution, optionally, according to the determined result, the first power of the magnetron is adjusted with the first power adjustment accuracy, and the second power of the semiconductor microwave source is adjusted with the second power adjustment accuracy, so that the overall power of the microwave cooking apparatus reaches the target power. If the target power is between the first maximum power and the second maximum power, the first power is adjusted to reach the target preset power, and the second power is adjusted with the second power adjustment accuracy so that the second power is the difference between the target power and the target preset power, wherein a plurality of preset powers are set between the first minimum power and the first maximum power, and the difference between any two adjacent preset powers is not greater than the second maximum power; the target preset power is any preset power which is not greater than the target power.

According to the technical solution, as for the magnetron, a plurality of preset powers are set in advance, and the difference value of any two adjacent preset powers is not greater than the second maximum power, it can be understood that the difference value between the preset powers is an integral multiple of the first power adjustment accuracy value, and the preset powers comprise the first maximum power and the first minimum power. Therefore, when the target power is between the first minimum power and the first maximum power, if the target power is equal to one of a plurality of preset powers, the target preset power is equal to the target power, the first power is adjusted with the first power adjustment accuracy so that the first power is equal to the preset target power, even if the overall power of the microwave cooking apparatus is equal to the target power, or the target preset power is smaller than the target power; after the first power is adjusted with the first power adjustment accuracy to enable the first power to be equal to the preset target power, the second power is adjusted with the second power adjustment accuracy to enable the second power to be equal to the difference value between the target power and the preset target power, at the moment, the value of the preset target power is not unique as long as the difference value between the target power and the preset target power is not greater than the second maximum power.

When the target power is not equal to any preset power, the target preset power is any one of at least one preset power smaller than the target power, so long as the difference between the target power and the first power is not greater than the second maximum power.

Optionally, in the case where the difference between the target power and the first power is not greater than the second maximum power, the value of the first power is not changed, and the second power is adjusted with the second power adjustment accuracy so that the second power is equal to the difference between the target power and the first power. Therefore, the value of the first power is fixed as far as possible, and the whole power of the microwave cooking apparatus is conveniently and quickly adjusted.

According to the technical solution, optionally, among at least one preset power which is not greater than the target power, the target preset power is a preset power closest to the target power.

According to the technical solution, the target preset power is the preset power which is closest to the target power in at least one preset power which is not greater than the target power, specifically: when the target power is equal to one of a plurality of preset powers, the target preset power is equal to the target power; when the target power is not equal to any preset power, the target preset power is the one with the maximum value of the at least one preset power smaller than the target power. According to the technical solution, the target preset power is close to the target power, so that the second preset power is able to be conveniently and quickly adjusted to enable the second preset power to be equal to the difference value between the target power and the target preset power.

Optionally, on the premise that the difference between any two adjacent preset powers is not greater than the second maximum power, the number of the preset powers is reduced as much as possible to reduce the value of the first power, so that the value of the first power is fixed as much as possible, and the whole power of the microwave cooking apparatus is conveniently and quickly adjusted.

Additional aspects and advantages of the present disclosure will be set forth in part in the description which follows, and in part will be obvious from the description, or may be learned by practice of the present disclosure.

BRIEF DESCRIPTION OF THE DRAWINGS

The foregoing and/or additional aspects and advantages of the present disclosure will be apparent from and elucidated with reference to the embodiments described hereinafter with reference to the accompanying drawings, in which.

DETAILED DESCRIPTION

In order that the above objects, features and advantages of the present disclosure may be more clearly understood, the present disclosure will be described in further detail with reference to the accompanying drawings and detailed description. It should be noted that the embodiments and features in the embodiments of the present disclosure may be combined with one another without conflict.

In the following description, numerous specific details are set forth in order to provide a thorough understanding of the present disclosure, but the present disclosure may be practiced otherwise than as described herein, and therefore, the scope of the present disclosure is not limited to the specific embodiments disclosed below.

A microwave cooking apparatus according to a first embodiment of the present disclosure will be described in detail with reference to FIGS. 1 and 2.

Figure 1:
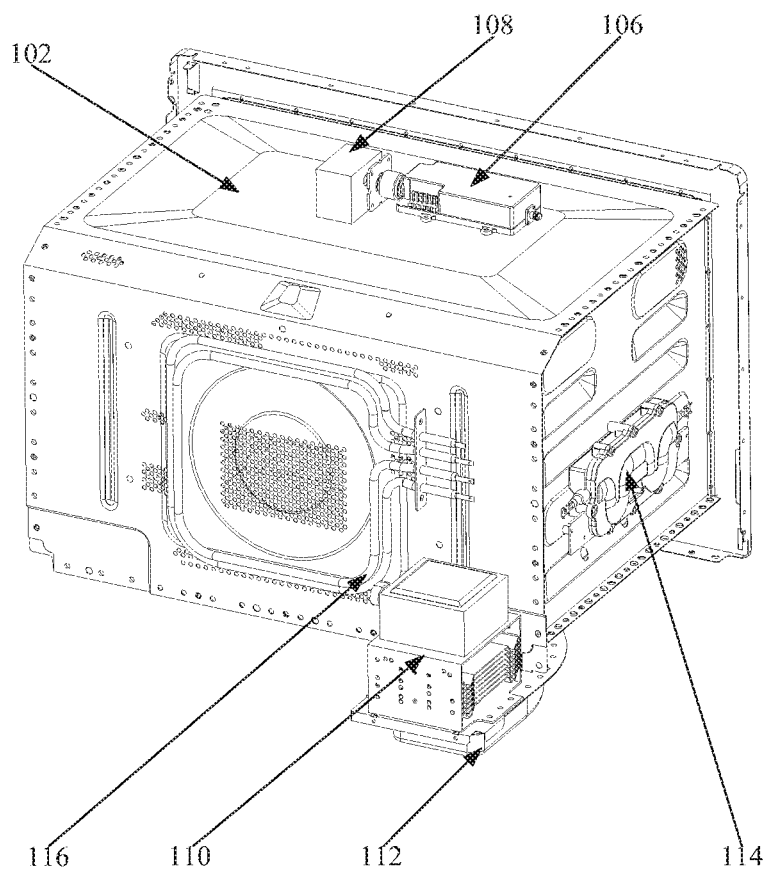
FIGS. 1 and 2 show schematic structural views of a microwave cooking apparatus according to an embodiment of the present disclosure.
Figure 2:
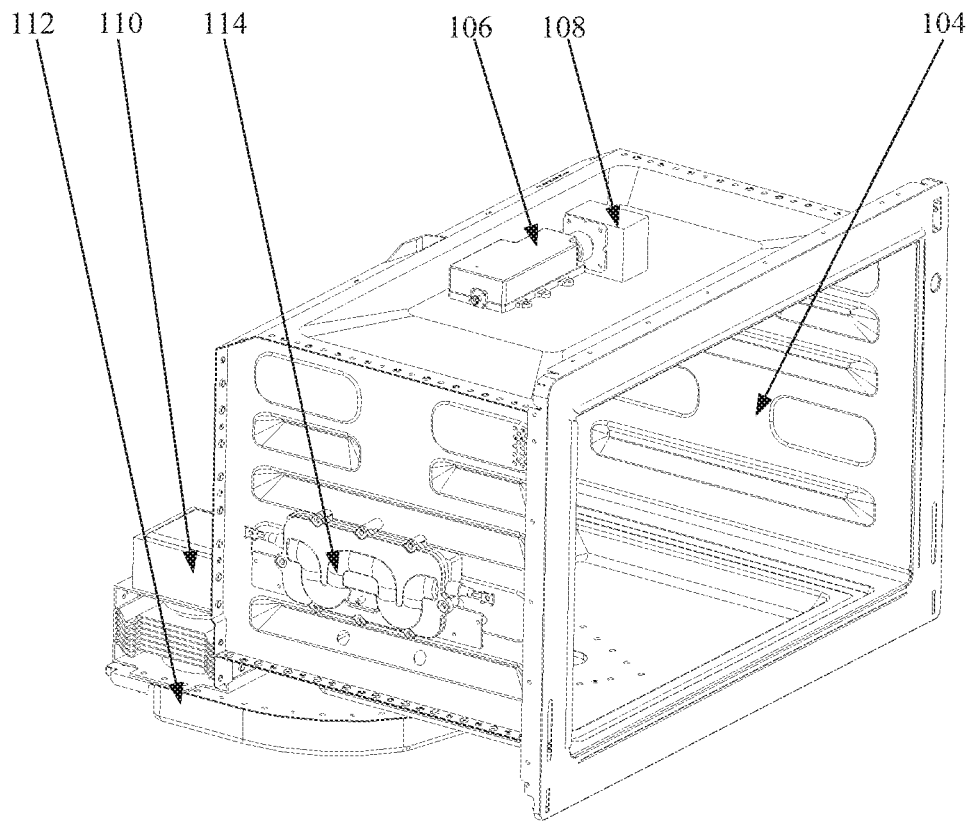

As shown in FIGS. 1 and 2, a microwave cooking apparatus according to an embodiment of the present disclosure comprises:

A housing 102; a heating chamber 104 with microwave resonant cavity characteristics; a solid microwave source 106 for generating low-power microwaves (controllable radio frequency microwaves) with a maximum power of 300 W; an antenna 108 for transmitting the low-power radio frequency microwaves into the heating chamber 104; a magnetron 110 for generating high-power microwaves (space free waves) with a maximum power of 1000 W; a waveguide 112 for feeding the microwaves generated by the magnetron into the cavity; a steam generator 114 generating high-temperature steam with a maximum power of 1400 W, and a heating pipe 116 generating high-temperature hot air and infrared rays with a maximum power of 1000 W.

And the solid microwave source 106 and other power devices (at least one of the magnetron 110, the steam generator 114 and the heating pipe 116) form a combined heating mode, so that the heating microwave power is able to be adjusted, and the heating and unfreezing effects are able to be improved.

As shown in FIGS. 1 and 2, the apparatus specifically comprises: a housing 102 in which a heating chamber 104 is able to be enclosed; a solid microwave source 106 disposed on the housing 102 and used for emitting a first variable-power microwave; an antenna 108 connected to the solid state microwave source 106 for feeding a first variable power microwave into the heating chamber 104; and a controller connected to the solid microwave source 106 and used for controlling the operation of the solid microwave source 106 and adjusting the first variable-power microwave.

As shown in FIGS. 1 and 2, further, the microwave cooking apparatus further comprises: a magnetron 110 disposed on the housing 102 and used for emitting second power microwaves; and a waveguide 112 disposed corresponding to the magnetron 110 and used for feeding the second power microwave into the heating chamber 104, wherein the controller is used for controlling the magnetron 110 to operate or controlling the magnetron 110 to operate synchronously with the solid microwave source 106.

As shown in FIGS. 1 and 2, further, the microwave cooking apparatus further comprises: a steam generator 114 disposed on the housing 102 and used for delivering high-temperature steam to the heating chamber 104, wherein the controller is used for controlling the steam generator 114 to operate or controlling the steam generator 114 to operate synchronously with the solid microwave source 106.

As shown in FIGS. 1 and 2, further, the microwave cooking apparatus further comprises: a heating pipe 116 adhered and disposed on the housing 102 and used for emitting high-temperature infrared rays, wherein the controller is used for controlling the heating pipe 116 to operate or controlling the heating pipe 116 to operate synchronously with the solid microwave source 106.

As shown in FIGS. 1 and 2, the housing 102 is of a cuboid structure; the front side of the housing 102 is provided with an opening of a heating chamber 104, and the solid microwave source 106 and the antenna 108 are respectively disposed at the top of the housing 102; the magnetron 110 is disposed at the rear part of the housing 102, and the waveguide 112 is disposed below the magnetron 110 and extends below the housing 102; the steam generator 114 is disposed on the side wall of the housing 102; the heating pipe is provided on the rear wall of the housing 102.

In addition, as a way of disposing the solid microwave source 106, the solid microwave source 106 comprises: a signal source used for generating an original microwave signal; a preamplifier connected to the signal source and used for amplifying the original microwave signal into a low-power microwave signal; a power divider connected to the preamplifier and used for distributing the low-power microwave signal into a multi-path microwave signal; a power amplification tube connected to the power divider, and used for amplifying power of the multi-path microwave signal to generate multi paths of the first variable power microwaves; a radio frequency ejection device used for transmitting first variable power microwaves to the antenna 108, wherein the power variation range of the first variable power microwaves is greater than or equal to 0 watt and smaller than or equal to 300 watts.

In this embodiment, by disposing the solid microwave source 106 and the antenna 108 for transmitting the variable-power microwaves emitted by the solid microwave source 106 on the housing 102, since the solid microwave source 106 has the characteristic that the microwave power is continuously adjustable with respect to the magnetron 110, and compared with the heating method using the magnetron 110, on the other hand, a better unfreezing effect is also able to be achieved because the power of a solid microwave source 106 is much lower than that of a magnetron 110 so that during an unfreezing operation, foods to be defrosted will not be locally cooked resulting from local overheating caused when the foods to be defrosted locally absorbs too much heat due to excessive power.

In the embodiment, the magnetron 110 is controlled by the controller to operate, so that the function of a single heating mode of the magnetron 110 is realized, the magnetron 110 and the solid microwave source 106 are controlled to operate together, the microwave power generated by the combination of the magnetron 110 and the solid microwave source 106 is higher, and the microwave energy generated in a corresponding unit time is larger, so that under the operating condition that high-power heating is required, and compared with the mode that the magnetron 110 is simply disposed, operating efficiency is able to be further improved.

In this embodiment, by controlling the synchronous operation of the steam generator 114 and the solid microwave source 106, and compared with the steam generator 114 and the magnetron 110 operating simultaneously, the resonance characteristic of the heating chamber 104 is able to be prevented from being changed because steam is condensed around the heating chamber 104 caused by the unadjustable microwave frequency. Because the solid microwave source 106 is able to arbitrarily adjust the emission frequency of the microwave source, the resonance point is able to be found again in the heating chamber 104 where condensation occurs and operation is able to be carried out at the resonance point, so that the purpose of improving the microwave heating efficiency is achieved.

In this embodiment, by setting a heating mode in which the heating pipe 116 and the solid microwave source 106 are operated in synchronization, and compared with the prior art in which the magnetron 110 and the heating pipe 116 are combined for heating, because the power is lower, the microwave power is only 300 W at maximum, the metal frame is able to be placed in the heating chamber to serve as a grill, and sparking caused by high induction voltage generated on the metal frame due to too high microwave power is avoided. Therefore, the operating safety under the barbecue mode (heating pipe 116+solid microwave source 106) is improved.

In this embodiment, by respectively disposing the solid microwave source 106, the magnetron 110, the steam generator 114 and the heating pipe in different regions of the housing 102, a reasonable configuration of the power component is realized, so that the preparation size of the existing microwave cooking apparatus may not be increased on the premise that the solid microwave source 106 is increased.

In addition, the position where the device is set is able to be adjusted according to adjustment of functions and operating modes.

In the embodiment, the microwave power sent by the signal source is able to be adjusted by respectively disposing the signal source, the preamplifier, the power divider and the power amplification tube, the operating voltage is low, the safety is high, the feeding into the heating chamber 104 through the antenna 108 is realized through the radio frequency ejection device, and the adjustable heating space is constructed, so that a rotating part needs to be disposed in the heating chamber 104. Therefore, the structure of the microwave cooking apparatus is facilitated to be simplified.

The power amplification tube is a GaN semiconductor power amplification tube.

Figure 3:
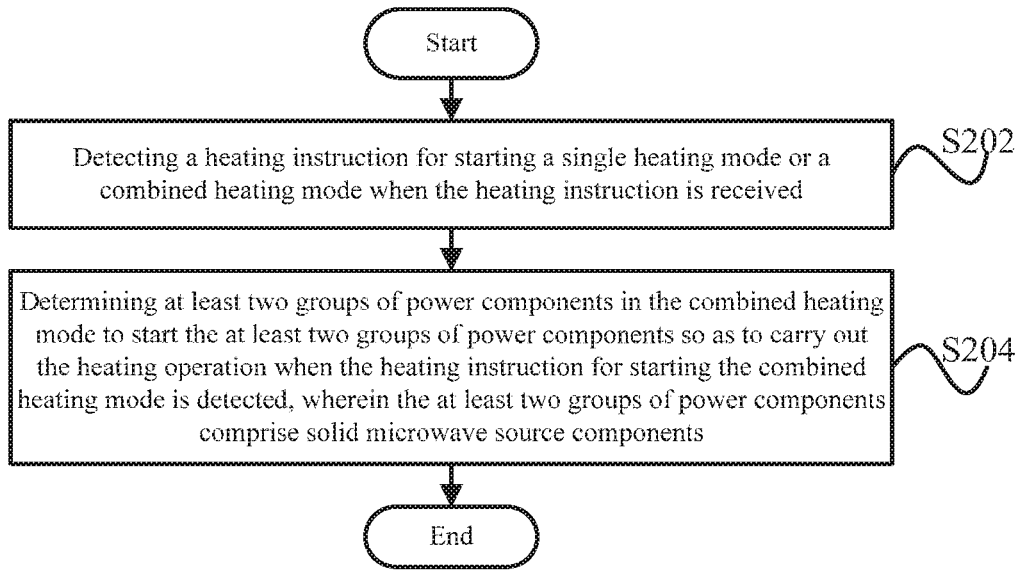
FIG. 3 is a flow diagram illustrating a control method according to an embodiment of the present disclosure.

FIG. 3 shows a flow diagram of a control method of an embodiment of the present disclosure.

As shown in FIG. 3, a control method according to an embodiment of the present disclosure includes:

step 202, detecting a heating instruction for starting a single heating mode or a combined heating mode when the heating instruction is received; and step 204, when the heating instruction for starting the combined heating mode is detected, determining at least two groups of power components in the combined heating mode to start the at least two power components so as to carry out the heating operation, wherein the at least two groups of power components comprise solid microwave source components.

In the embodiment, when a microwave heating instruction is received, firstly, the type of the microwave heating instruction is determined and is able to be divided according to a power device controlled to be started by the heating instruction as comprising a single heating mode and a combined heating mode. When the combined heating mode is determined, a power component corresponding to the combined heating mode is determined to control the microwave heating operation to be carried out between the starting powers. The solid microwave source has the characteristic that the microwave power is continuously adjustable relative to the magnetron, on one hand, a better heating effect is able to be achieved for sealed foods, and on the other hand, a better unfreezing effect is also able to be achieved because the power of a solid microwave source is much lower than that of a magnetron so that during an unfreezing operation, foods to be defrosted will not be locally cooked resulting from local overheating caused when the foods to be defrosted locally absorbs too much heat due to excessive power.

In addition, the type of the instruction may be divided according to the magnitude of the heating power.

Further, according to the embodiments, further comprising: when detecting that a heating instruction is used for starting a single heating mode, determining a power component corresponding to the single heating mode so as to start the power component to carry out a heating operation, wherein the power component comprises any one of a solid microwave source, a magnetron, a steam generator and a heating pipe.

In this embodiment, four single heating modes are set as follows: a solid microwave source heating mode, a magnetron heating mode, a steam heating mode and a heating pipe heating mode, wherein the magnetron heating mode is able to meet the high-power heating requirement, the solid microwave source heating mode is able to meet the unfreezing requirement, with the steam storage heating mode, high-temperature steam is able to be generated, the taste caused by heating errors is able to be improved, and the barbecue function is able to be realized by the heating pipe heating mode.

Embodiment 1

Figure 4:
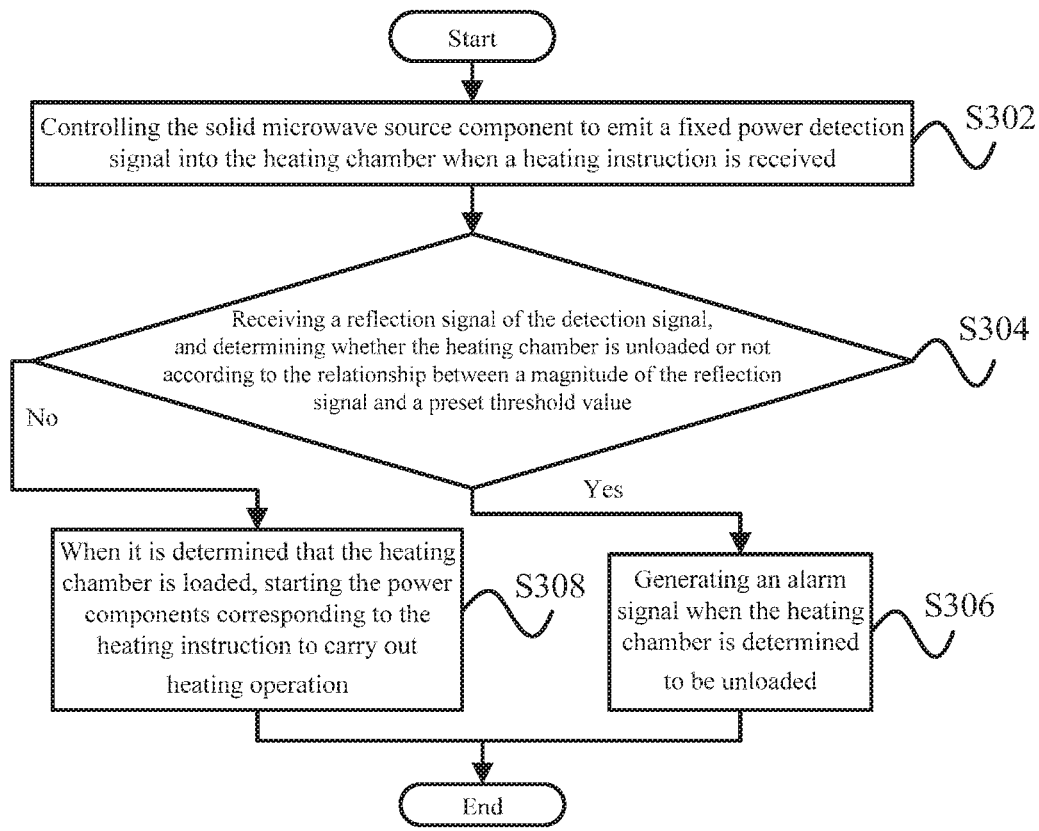
FIG. 4 is a flow diagram illustrating a unloaded detection method according to an embodiment of the present disclosure.

As shown in FIG. 4, the unloaded detection method according to the embodiment of the present disclosure comprises the following steps:

Further, in the embodiment, before the heating operation is performed, there are further steps: step 302, the solid microwave source component is controlled to emit a fixed power detection signal into the heating chamber when a heating instruction is received; step 304, a reflection signal of the detection signal is received, and whether the heating chamber is unloaded or not is determined according to the comparison of the magnitude of the reflection signal with a preset threshold value; step 306, an alarm signal is generated when the heating chamber is determined to be unloaded; and step 308, when it is determined that the heating chamber is loaded, the power component corresponding to the heating instruction is started to carry out the heating operation.

In the embodiment, a small detection signal with a fixed power value is emitted to the heating chamber, then whether the magnitude of a reflection signal of the detection signal exceeds a preset threshold value or not is detected; whether the heating chamber is unloaded or not is determined, and the heating chamber is determined to be unloaded if the magnitude of the reflection signal of the detection signal exceeds the preset threshold value, vice versa. On one hand, the function of directly detecting no load through microwave signal is realized, and other detection devices do not need to be disposed, on the other hand, when no load is detected, an alarm signal is generated, so that the safety of the microwave cooking apparatus is improved.

Compared with the magnetron, the solid microwave source has the following advantages: (1) the microwave power is able to be accurately and stably emitted, the microwave power emitted by the magnetron is unstable (the size change is more than 10%) and (2) the microwave emitted by the magnetron is a space free wave, the returned power is unable to be accurately detected, the microwave emitted by the solid source is a guided wave, and the returned microwave power is able to be accurately detected. Therefore, the unloaded detection function is able to be realized only by transmitting the detection signal through the solid microwave source.

In particular, in a heating chamber of a given size and shape, the microwave absorption rate is constant at no load and is at a minimum value, for example, the unloaded microwave absorption rate (loss) of the heating chamber is 4%, then 4% of the microwave power emitted by the microwave source is lost at no load, 96% of the microwave power is returned to the solid microwave source originally, and therefore a microwave detection signal with accurate power is emitted, for example, the power value is 100 W, and then the power value of the reflected signal reflected back is detected, and if it is greater than or equal to 96 W, it is determined to be unloaded, and if it is less than 96 W, it is determined to be loaded.

Further, the combined heating mode specifically includes, but is not limited to, the following combined modes, and the function of combined heating is realized through controller control.

Embodiment II

According to the combination of the solid microwave source and the magnetron, the magnetron and the solid microwave source are controlled to operate together, the microwave power generated by the combination of the magnetron and the solid microwave source is higher, and the microwave energy generated in a corresponding unit time is larger, so that the operating efficiency is able to be further improved compared with the mode of simply disposing the magnetron under the operating condition that high-power heating is required.

Embodiment III

According to the combination of the solid microwave source and the steam generator, the steam generator and the solid microwave source are controlled to operate synchronously, and compared with the steam generator and the magnetron operating simultaneously, the resonance characteristic of the heating chamber is able to be prevented from being changed because steam is condensed around the heating chamber caused by the unadjustable microwave frequency. Because the solid microwave source is able to arbitrarily adjust the emission frequency of the microwave source, the resonance point is able to be found again in the heating chamber where condensation occurs and operation is able to be carried out at the resonance point, so that the purpose of improving the microwave heating efficiency is achieved.

Embodiment IV

The solid microwave source and the heating pipe are combined, with the heating mode that the heating pipe and the solid microwave source operate synchronously being set, and compared with the heating mode in which the magnetron and the heating pipe are combined for heating in the prior art, because the power is lower, the microwave power is only 300 W at maximum, the metal frame is able to be placed in the heating chamber to serve as a grill, and sparking caused by high induction voltage generated on the metal frame due to too high microwave power is avoided. Therefore, the operating safety under the barbecue mode (heating pipe+solid microwave source) is improved.

Figure 5:
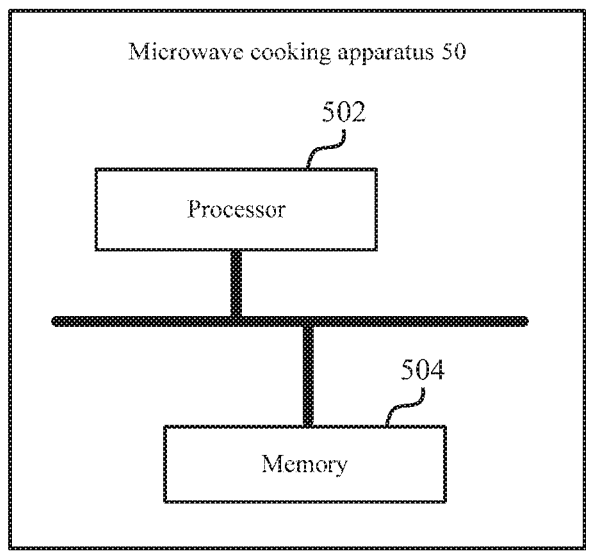
FIG. 5 shows a schematic block diagram of a microwave cooking apparatus of an embodiment of the present disclosure.

FIG. 5 shows a schematic block diagram of a microwave cooking apparatus according to a second embodiment of the present disclosure.

As shown in FIG. 5, a microwave cooking apparatus 50 according to a second embodiment of the present disclosure includes a processor 502 and a memory 504, wherein a computer program executable on the processor 502 is stored on the memory 504, wherein the memory 504 and the processor 502 may be connected via a bus. The processor 502 performs the steps of the microwave cooking apparatus as described in the above embodiments when executing a computer program stored in the memory 504.

Embodiment V

Figure 6:
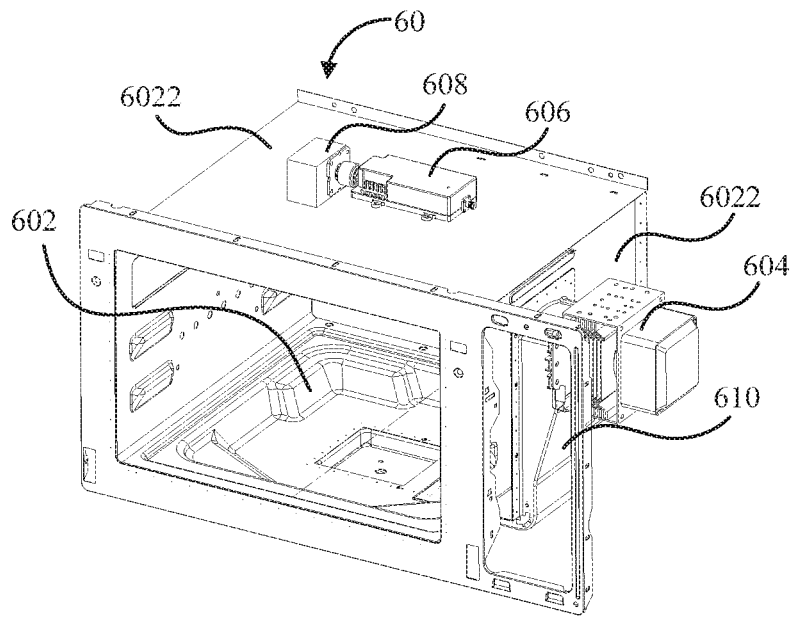
FIG. 6 shows a schematic structural view of a microwave cooking apparatus according to an embodiment of the present disclosure.

As shown in FIG. 6, an embodiment of the first aspect of the present disclosure provides a microwave cooking apparatus 60 including: a cavity 602 surrounded by a plurality of side walls 6022, a magnetron 604 and a semiconductor microwave source 606 are respectively and fixedly arranged on the outer sides of two adjacent side walls 6022 of the cavity 602, a first microwave generated by the magnetron 604 is fed into the cavity 602 through a waveguide 610 fixedly arranged on the side plate, a second microwave generated by the semiconductor microwave source 606 is fed into the cavity 602 through a band-stop antenna 608 fixedly arranged on the side wall 6022. In the embodiment, the first minimum power of the first microwave is 300 W, the first maximum power of the first microwave is 1000 W, the first power adjustment accuracy is 100 W, and the magnetron 604 adjusts the power of the first microwave between 300 W and 1000 W with the first power adjustment accuracy of 100 W; the first frequency range of the first microwave is 2440-2460 MHz, the second minimum power of the second microwave is 0 W, the second maximum power of the second microwave is 350 W, the second power adjustment accuracy is 1 W, and the semiconductor microwave source adjusts the power of the second microwave between 0 and 350 W with the second power adjustment accuracy of 1 W; the second frequency range of the second microwave is 2400-2435 MHz and 2465-2500 MHz, wherein the band-stop frequency of the band-stop antenna 608 is 2440-2460 MHz and coincides with the first frequency range of the first microwave, the band-stop antenna 608 comprises an antenna and a filter connected with the antenna, and the antenna is used for feeding the second microwave into the cavity 602; a filter is connected to the antenna and the semiconductor microwave source 606 and is used to shield the second microwave in the first frequency range.

In this embodiment, the microwave cooking apparatus 60 has two microwave sources, a magnetron 604 and a semiconductor microwave source 606, respectively. When the magnetron 604 is separately operated, the first microwave generated by the magnetron 604 is fed into the cavity 602 through the waveguide 610, and the overall power range of the microwave cooking apparatus 60 is 300-1000 W. The microwave cooking apparatus 60 is capable of adjusting the overall power of the microwave cooking apparatus 60 (i.e., the sum of the power of the first microwave and the power of the second microwave) with a first power adjustment accuracy of 100 W between 300-1000 W, when the performance of the microwave cooking apparatus 60 is similar to that of the conventional microwave cooking apparatus 60 having a single magnetron 604.

When the semiconductor microwave source 606 operates independently, the overall power range of the microwave cooking apparatus 60 is 0-350 W, and the microwave cooking apparatus 60 is able to adjust the overall power of the microwave cooking apparatus 60 with a second power adjustment accuracy of 1 W between 0-350 W, so that the power adjustment accuracy of the microwave cooking apparatus 60 is higher, and more power steps are able to be adjusted. The microwave cooking apparatus 60 is able to meet more heating requirements.

When the magnetron 604 and the semiconductor microwave source 606 are operated at the same time, the overall power range of the microwave cooking apparatus 60 is 0-1350 W, the overall power range is greatly increased, the instability of the operation of the magnetron 604 in a low power state is able to be ignored, the value of the overall power between 0-300 W is able to be achieved, the upper power limit of the magnetron 604 is able to be overcome, and the value of the overall power between 1000-1350 W is able to be achieved. More importantly, by simultaneously adjusting the operating states of the magnetron 604 and the semiconductor microwave source 606, the overall power of the microwave cooking apparatus 60 is able to be adjusted between 0-1350 W with a second power adjustment accuracy of 1 W, the load response is more uniform, the efficiency is higher, various heating requirements are able to be met, and the applicability is better.

It should also be noted that the first frequency range of the first microwave does not overlap with the second frequency range of the second microwave, preventing the possibility that the first microwave and the second microwave interfere with each other when the magnetron 604 and the semiconductor 606 microwave source are operated simultaneously, and increasing the reliability of heating the microwave cooking apparatus 60. Further, the filter is able to shield the second microwaves located in the first frequency range, that is, only the second microwaves located outside the first frequency range are able to pass through the filter, and finally the second microwaves are fed into the cavity 602 through the antenna, thereby reducing the possibility that the second microwaves and the first microwaves interfere with each other and increasing the heating reliability of the microwave cooking apparatus 60.

Optionally, the microwave cooking apparatus 60 is a microwave oven, and the heating gear is able to be flexibly adjusted according to different food materials, thereby satisfying different heating demands of users.

It should be noted that the microwave cooking apparatus 60 includes microwave ovens and other devices that utilize microwaves for heating.

Optionally, the band-stop antenna 608 includes an antenna and a circulator connected to the antenna for shielding the second microwaves located in the first frequency range, that is, only the second microwaves located outside the first frequency range are able to pass through the circulator, and finally the second microwaves are fed into the cavity 602 through the antenna, thereby reducing the possibility that the second microwaves and the first microwaves interfere with each other and increasing the heating reliability of the microwave cooking apparatus 60.

Optionally, the second power adjustment accuracy is 10 W, and when the magnetron 604 and the semiconductor microwave source 606 are operated at the same time, the overall power of the microwave cooking apparatus 60 is adjusted at the second power adjustment accuracy of 10 W between 0 and 1350 W, which is more applicable than when the magnetron 604 operates alone with the first power adjustment accuracy of 100 W.

Optionally, the power range of the semiconductor microwave source 606 is no greater than the minimum step value of the first power adjustment accuracy to achieve continuous adjustment of the power of the microwave cooking apparatus 60 with the second power adjustment accuracy over the overall power range of the microwave cooking apparatus 60.

Embodiment VI

Figure 7:
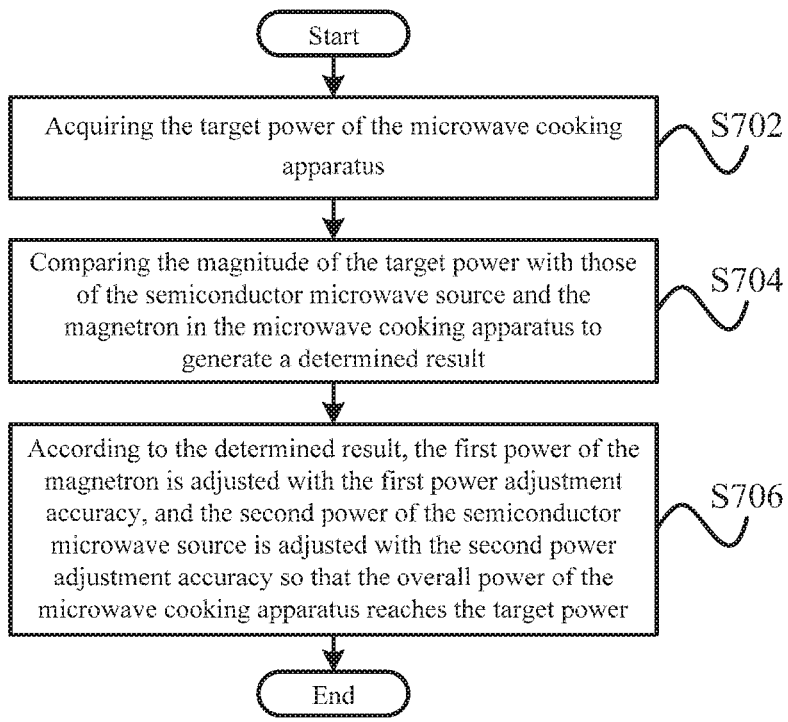
FIG. 7 shows a flow diagram of a control method according to an embodiment of the present disclosure.

As shown in FIG. 7, an embodiment of the second aspect of the present disclosure provides a control method for a microwave cooking apparatus 60 in any embodiment of the first aspect, and the control method comprises:

step S702, a target power of the microwave cooking apparatus 60 is acquired;

step S704, the magnitude of the target power is compared with those of the semiconductor microwave source 606 and the magnetron 604 in the microwave cooking apparatus 60 to generate a determined result;

and step S706, according to the determined result, the first power of the magnetron 604 is adjusted with a first power adjustment accuracy, and the second power of the semiconductor microwave source 606 is adjusted with a second power adjustment accuracy so that the overall power of the microwave cooking apparatus 60 reaches the target power.

The overall power is the sum of the first power and the second power.

In this embodiment, the overall power of the microwave oven is the sum of the first power of the magnetron 604 and the second power of the semiconductor microwave source 606, and it will be appreciated that the first power of the magnetron is the power of the first microwave and the second power of the semiconductor microwave source 606 is the power of the second microwave. When the microwave cooking apparatus 60 operates, in step S702, the target power of the microwave cooking apparatus 60 is acquired, and then, in step S704, the magnitude of the target power is compared with those of the semiconductor microwave source 606 and the magnetron 604 in the microwave cooking apparatus 60 to acquire a determined result. The power parameters of the magnetron 604 include a first minimum power, a first maximum power, and a first power adjustment accuracy of the first microwave, and the power parameters of the semiconductor microwave source 606 include a second minimum power, a second maximum power, and a second power adjustment accuracy of the second microwave. In step S706, determining the first power and the second power according to the determined result so that the total power is equal to the target power, specifically, on the one hand, when the accuracy of the target power is not higher than the first power adjustment accuracy, the first power of the magnetron 604 is able to be adjusted with the first power adjustment accuracy so that the accuracy of the total power is matched with the accuracy of the target power, and the second power of the semiconductor microwave source 606 is able to be adjusted with the second power adjustment accuracy, the accuracy of the whole power is matched with the accuracy of the target power, the first power and the second power are able to be adjusted simultaneously, and the accuracy of the whole power is matched with the accuracy of the target power; when the accuracy of the target power is higher than the first power adjustment accuracy, the second power must be adjusted to make the overall power equal to the target power by adjusting the second power with the second power adjustment accuracy regardless of whether the magnetron 604 operates or not. On the other hand, the first power of the magnetron 604 and the second power of the semiconductor microwave source 606 are compared by magnitude so that the sum of the first power and the second power, that is, the total power of the microwave cooking apparatus 60 reaches the target power, according to the relation between the target power and the first maximum power and the second maximum power.

Embodiment VII

Figure 8:
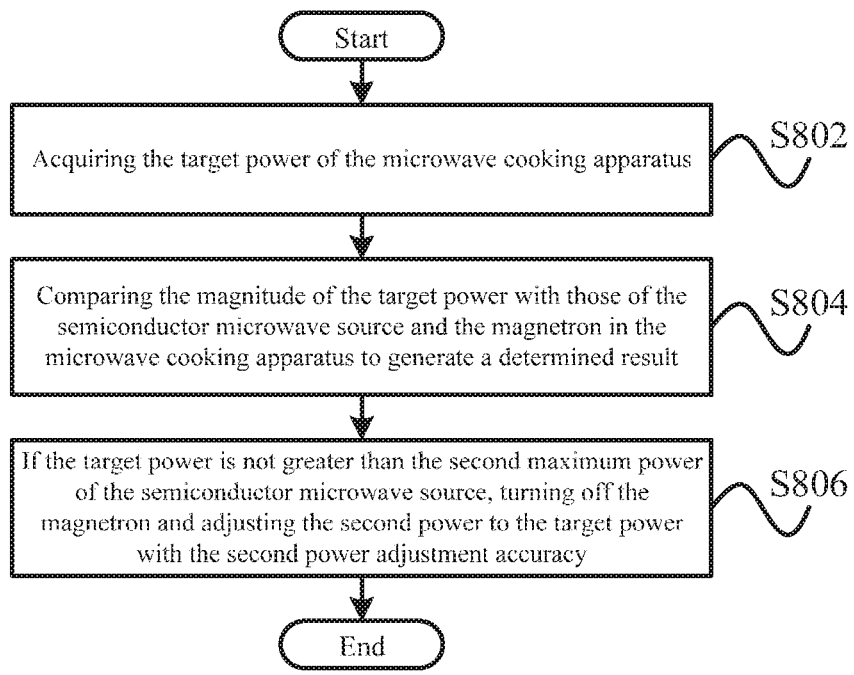
FIG. 8 shows a flow diagram of a control method according to an embodiment of the present disclosure.

As shown in FIG. 8, in one embodiment of the present disclosure, the control method comprises the following steps:

step S802, a target power of the microwave cooking apparatus 60 is acquired;

step S804, the magnitude of the target power is compared with those of the semiconductor microwave source 606 and the magnetron 604 in the microwave cooking apparatus 60, and a determined result is acquired;

step S806, if the target power is not greater than the second maximum power of the semiconductor microwave source 606, the magnetron 604 is turned off and the second power to the target power is adjusted with the second power adjustment accuracy.

In this embodiment, when the microwave cooking apparatus 60 operates, in step S802, the target power of the microwave cooking apparatus 60 is acquired, and then, in step S804, the relation between the target power and the power parameters of the semiconductor microwave source 606 and the magnetron 604 in the microwave cooking apparatus 60 is determined to generate a determined result. In step S806, when the target power is not greater than the second maximum power of the semiconductor microwave source 606, the overall power is able to be made equal to the target power by operating only the semiconductor microwave source 606, so that the magnetron 604 is turned off the microwave source of the microwave cooking apparatus 60 is the semiconductor microwave source 606, and the second power is adjusted to the target power with the second power adjustment accuracy, so that the overall power is made equal to the target power. Operating the semiconductor microwave source 606 alone is able to not only increase the overall power regulation accuracy of the microwave cooking apparatus 60, enable the microwave cooking apparatus 60 to meet more heating requirements, but also simplify the power regulation process of the microwave cooking apparatus 60 and facilitate the control of the microwave cooking apparatus 60. At the same time, due to the limitation of the power range of the magnetron 604, the overall power is unable to be increased from 0. The semiconductor microwave source 606 may gradually increase the overall power of the microwave cooking apparatus 60 from 0 to increase the overall power range of the microwave cooking apparatus 60 and increase the applicability of the microwave cooking apparatus 60.

Embodiment VIII

Figure 9:
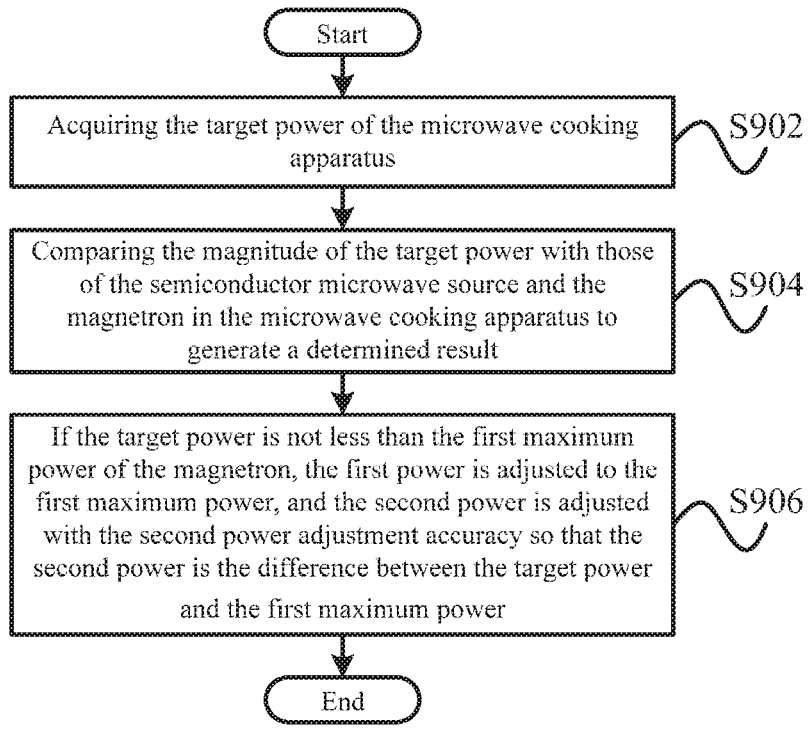
FIG. 9 shows a flow diagram of a control method according to an embodiment of the present disclosure.

As shown in FIG. 9, in one embodiment of the present disclosure, the control method comprises the following steps:

step S902, a target power of the microwave cooking apparatus 60 is acquired;

step S904, the magnitude of the target power is compared with those of the semiconductor microwave source 606 and the magnetron 604 in the microwave cooking apparatus 60 to generate a determined result;

step S906, if the target power is not less than the first maximum power of the magnetron 604, the first power is adjusted to reach the first maximum power, and the second power is adjusted to the second power adjustment accuracy so that the second power is the difference between the target power and the first maximum power.

In this embodiment, when the microwave cooking apparatus 60 operates, in step S902, the target power of the microwave cooking apparatus 60 is acquired, and then, in step S904, the relation between the target power and the power parameters of the semiconductor microwave source 606 and the magnetron 604 in the microwave cooking apparatus 60 is determined to generate a determined result. In step S906, when the target power is not less than the first maximum power of the magnetron 604, the first power of the magnetron 604 is adjusted to reach the first maximum power, that is, the magnetron 604 operates at the first maximum power, and then the second power of the semiconductor microwave source 606 is adjusted with the second power adjustment accuracy, and the sum of the first power and the second power, that is, the total power is equal to the target power. Specifically, if the target power is equal to the first maximum power, the magnetron 604 operates at the first maximum power, and the semiconductor microwave source 606 does not operate; if the target power is greater than the first maximum power, the semiconductor microwave source 606 operates while the magnetron 604 operates at the first maximum power so that the second power is equal to the difference between the target power and the first maximum power.

Embodiment IX

Figure 10:
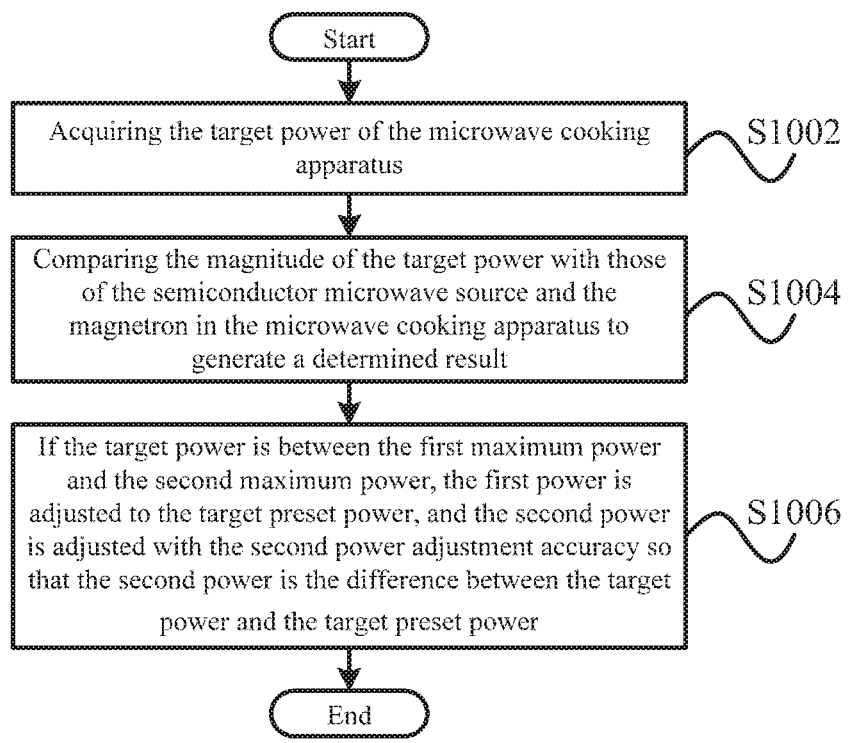
FIG. 10 shows a flow diagram of a control method according to an embodiment of the present disclosure.

As shown in FIG. 10, in one embodiment of the present disclosure, the control method comprises the following steps:

step S1002, a target power of the microwave cooking apparatus 60 is acquired;

step S1004, the magnitude of the target power is compared with those of the semiconductor microwave source 606 and the magnetron 604 in the microwave cooking apparatus 60 to generate a determined result;

step S1006, if the target power is between the first maximum power and the second maximum power, the first power is adjusted to reach the target preset power, and the second power is adjusted with the second power adjustment accuracy so that the second power is the difference between the target power and the target preset power:

A plurality of preset powers are set between the first minimum power and the first maximum power, the difference between any two adjacent preset powers is not greater than the second maximum power, and the target preset power is any preset power which is not greater than the target power.

In this embodiment, for the magnetron 604, a plurality of preset powers are preset, and the difference between any two adjacent preset powers is not greater than the second maximum power. It is understood that the difference between the preset powers is an integer multiple of the first power adjustment accuracy value, and the preset powers include the first maximum power and the first minimum power. When the microwave cooking apparatus 60 operates, in step S1002, the target power of the microwave cooking apparatus 60 is acquired, and then, in step S1004, the magnitude of the target power is compared with those of the semiconductor microwave source 606 and the magnetron 604 in the microwave cooking apparatus 60 to generate a determined result. In step S1006, when the target power is between the first minimum power and the first maximum power, if the target power is equal to one of a plurality of preset powers, the target preset power is equal to the target power, adjusting the first power with a first power adjustment accuracy so that the first power is equal to the preset target power, even if the overall power of the microwave cooking apparatus 60 is equal to the target power; or the target preset power is smaller than the target power, the first power is adjusted according to the first power adjustment accuracy to enable the first power to be equal to the preset target power, the second power is adjusted according to the second power adjustment accuracy to enable the second power to be equal to the difference value between the target power and the preset target power, at the moment, the value of the preset target power is not unique as long as the difference value between the target power and the preset target power is not greater than the second maximum power.

When the target power is not equal to any preset power, the target preset power is any one of at least one preset power smaller than the target power, so long as the difference between the target power and the first power is not greater than the second maximum power.

Optionally, in the case where the difference between the target power and the first power is not greater than the second maximum power, the value of the first power is not changed, and the second power is adjusted with the second power adjustment accuracy so that the second power is equal to the difference between the target power and the first power. The value of the first power is thus fixed as much as possible to facilitate rapid adjustment of the overall power of the microwave cooking apparatus 60.

Optionally, among at least one preset power which is not greater than the target power, the target preset power is a preset power closest to the target power. Specifically, when the target power is equal to one of a plurality of preset powers, the target preset power is equal to the target power; when the target power is not equal to any preset power, the target preset power is one of at least one preset power smaller than the target power and the maximum value. In the embodiment, the target preset power is close to the target power, so that the second preset power is able to be conveniently and quickly adjusted to enable the second preset power to be equal to the difference value between the target power and the target preset power.

Optionally, on the premise that the difference between any two adjacent preset powers is not greater than the second maximum power, the number of the preset powers is reduced as much as possible so as to reduce the value of the first power, thereby fixing the value of the first power as much as possible and facilitating rapid adjustment of the overall power of the microwave cooking apparatus 60.

In one embodiment of the present disclosure, optionally, the first minimum power of the magnetron 604 is 300 W, the first maximum power of the magnetron 604 is 900 W, the first power adjustment accuracy is 100 W, the second minimum power of the semiconductor microwave source 606 is 0 W, the second maximum power is 350 W, the second power adjustment accuracy is 1 W, and the preset powers of the magnetron 604 are 300 W, 600 W and 900 W.

In this embodiment, when the target power is not greater than 350 W, the magnetron 604 is turned off, the semiconductor microwave source 606 operates alone, and the second power of the semiconductor microwave source 606 is adjusted with the second power adjustment accuracy so that the second power is equal to the target power, that is, the total power is equal to the target power.

When the target power is greater than 300 W and not greater than 600 W, the first power of the magnetron 604 is adjusted to 300 W with a first power adjustment accuracy, and the second power is adjusted with a second power adjustment accuracy so that the second power is equal to the difference between the target power and the first power, i.e., the difference between the target power and 300 W.

When the target power is greater than 600 W and not greater than 900 W, the first power of the magnetron 604 is adjusted to 900 W with a first power adjustment accuracy, and the second power is adjusted with a second power adjustment accuracy so that the second power is equal to the difference between the target power and the first power, i.e., the difference between the target power and 600 W.

When the target power is greater than 900 W and not greater than 1250 W, the first power of the magnetron 604 is adjusted to 900 W with a first power adjustment accuracy, and the second power is adjusted with a second power adjustment accuracy so that the second power is equal to the difference between the target power and the first power, i.e., the difference between the target power and 900 W.

In this embodiment, it is convenient to quickly adjust the overall power of the microwave cooking apparatus 60 by minimizing the number of preset powers and fixing the value of the first power as much as possible.

The steps in the method of the embodiment of the present disclosure are able to be sequentially adjusted, combined and deleted according to actual needs.

According to an embodiment of the present disclosure, provided is a computer readable storage medium having stored thereon a computer program, when the computer program is executed by a processor, the steps of a microwave cooking apparatus as described according to embodiments are implemented.

It is further understood that any process or method description in the flowchart or otherwise described herein may be understood to represent devices, segments, or portions of code comprising one or more executable instructions for implementing the steps of a particular logical function or process, and that the scope of the preferred embodiments of the present disclosure includes additional implementations. The functions may be performed out of the order shown or discussed, including in a substantially simultaneous manner or in a reverse order, depending on the functionality involved, as will be appreciated by those skilled in the art to which the embodiments of the present disclosure pertain.

The logic and/or steps shown in the flowcharts or otherwise described herein may be, for example, an ordered listing of executable instructions that may be considered to implement logical functions and may be embodied in any computer-readable medium for use by an instruction execution system, device, or apparatus (e.g., a computer-based system, a processor-containing system, or other system that is able to acquire instructions from an instruction execution system, apparatus, or device and execute the instructions) or is able to be used in combination with the instruction execution system, device, or apparatus. For the purposes of this specification, a "computer-readable medium" is able to be any means that is able to contain, store, communicate, propagate, or transport the program for use by or in connection with the instruction execution system, device, or device. More specific examples (a non-exhaustive list) of the computer-readable medium include the following: an electrical connection (electronic device), a portable computer cartridge (magnetic device), a random access memory (RAM), a read-only memory (ROM), an erasable programmable read-only memory (EPROM or Flash memory), an optical fiber device, and a portable compact disc read-only memory (CDROM) having one or more wiring lines. In addition, the computer-readable medium may even be paper or other suitable medium upon which the program is printed, as the program may be electronically acquired, such as by optically scanning the paper or other medium, followed by editing, interpreting, or otherwise processing in a suitable manner if necessary, and then stored in a computer memory.

It is to be understood that portions of the present disclosure may be implemented in hardware, software, firmware, or a combination thereof. In the embodiments described above, the steps or methods may be implemented in software or firmware stored in memory and executed by a suitable instruction execution system. For example, if implemented in hardware, as in another embodiment, it may be implemented using any one or a combination of the following techniques known in the art: discrete logic circuits with logic gates for implementing logic functions on data signal, application specific integrated circuits with appropriate combinational logic gates, programmable gate arrays (PGAs), field programmable gate arrays (FPGAs), etc.

It will be appreciated by those of ordinary skill in the art that all or a portion of the steps carried by a method of implementing the embodiments described above may be performed by program instructions associated with hardware, which may be stored in a computer-readable storage medium, which when executed, includes one or a combination of the steps of the embodiments of the method.

Furthermore, the functional units in the various embodiments of the present disclosure may be integrated in one processing device, may be separate physical units, or may be integrated in one device in two or more units. The integrated device is able to be realized in the form of hardware or software functional devices. The integrated device, if implemented in the form of a software functional device and sold or used as a stand-alone product, may also be stored in a computer-readable storage medium.

The above-mentioned storage medium may be a read-only memory, a magnetic disk or an optical disk, etc.

According to the technical solution, multiple heating modes are generated by adding a solid microwave source and controlling the solid microwave source to replace the combination of a magnetron and other power components, so that the heating function with adjustable power is able to be realized, and the heating effect is improved.

The foregoing is only a preferred embodiment of the disclosure and is not intended to limit the present disclosure, as various modifications and changes therein will occur to those skilled in the art. Any modifications, equivalents, improvements, etc. that come within the spirit and principles of the present disclosure are intended to be included within the scope of the present disclosure.

What is claimed is:

1. A microwave cooking apparatus, comprising:
    a housing including a heating chamber therein;
    a solid microwave source disposed on the housing and configured to emit a first variable-power microwave;
    an antenna connected to the solid microwave source and configured to feed the first variable-power microwave into the heating chamber;
    a magnetron disposed on the housing, the magnetron configured to emit a second power microwave;
    a waveguide coupled to the magnetron and configured to feed the second power microwave into the heating chamber;
    a steam generator disposed on the housing, and configured to deliver high temperature steam to the heating chamber;
    a heating pipe adhered to and disposed on the housing and connected to the controller, and configured to emit high-temperature infrared rays; and
    a controller connected to the solid microwave source and configured to control the solid microwave source to operate and to adjust the first variable-power microwave,
    wherein:
        the housing is of a cuboid structure,
        the solid microwave source and the antenna are respectively disposed at a top of the housing,
        the magnetron is disposed at a rear part of the housing, the waveguide is disposed below the magnetron and extends to a lower part of the housing, the steam generator is disposed on a side wall of the housing, and the heating pipe is disposed on a rear wall of the housing.

2. The microwave cooking apparatus according to claim 1, wherein the controller is configured to control the magnetron to operate, including controlling the magnetron to operate synchronously with the solid microwave source.

3. The microwave cooking apparatus according to claim 1, wherein the controller is configured to control the steam generator to operate, including controlling the steam generator to operate synchronously with the solid microwave source.

4. The microwave cooking apparatus according to claim 1, wherein the controller is configured to control the heating pipe to operate, including controlling the heating pipe to operate synchronously with the solid microwave source.

5. The microwave cooking apparatus according to claim 1, wherein the solid microwave source comprises:

a signal source configured to generate an original microwave signal;

a preamplifier connected to the signal source and configured to amplify the original microwave signal into a low-power microwave signal;

a power divider connected to the preamplifier and configured to distribute the low-power microwave signal into a multi-path microwave signal;

a power amplification tube connected to the power divider and configured to amplify power of the multi-path microwave signal to generate multiple paths of the first variable power microwave;

a radio frequency ejection device respectively connected to the power amplification tube and to the antenna, and configured to transmit the first variable power microwave to the antenna; and a power variation range of the first variable power microwave is greater than or equal to 0 watt and less than or equal to 300 watts.

6. A control method for a microwave cooking apparatus, comprising:

detecting a heating instruction for starting a combined heating mode;

determining at least two groups of power components in the combined heating mode; and performing a heating operation by starting the at least two groups of power components, a first group of power component of the at least two groups of power components configured to feed a first microwave having a first frequency range, and a second group of power component of the at least two groups of power components configured to feed a second microwave having a second frequency range; and shielding the second microwave in the first frequency range by a band-stop antenna connected to the second group of power component, the band-stop antenna including:

an antenna configured to feed the second microwave; and one or more of:

a filter connected to the antenna, and configured to shield the second microwave in the first frequency range; or a circulator connected to the antenna, and configured to shield the second microwave in the first frequency range.

7. The control method according to claim 6, before the performing the heating operation, further comprising:

controlling the solid microwave source component to emit a fixed power detection signal into a heating chamber;

receiving a reflection signal of the fixed power detection signal;

determining whether the heating chamber is unloaded based on analyzing a magnitude of the reflection signal with a threshold value;

generating an alarm signal when it is determined that the heating chamber is unloaded; and when it is determined that the heating chamber is loaded, executing the heating operation according to the heating instruction.

8. The control method according to claim 6, wherein the combined heating mode comprises one of a combination of the solid microwave source and a magnetron, a combination of the solid microwave source and a steam generator, and a combination of the solid microwave source and a heating pipe.

9. The control method according to claim 6, further comprising:

detecting a heating instruction for starting a single heating mode;

determining a power component corresponding to the single heating mode; and performing a heating operation by starting the power component;

wherein the power component includes one of the solid microwave source, a magnetron, a steam generator and a heating pipe.

10. A microwave cooking apparatus, comprising:

a cavity;

a magnetron fixedly disposed on a side wall of the cavity and configured to feed a first microwave into the cavity, wherein the magnetron adjusts a power of the first microwave with a first power adjustment accuracy;

a semiconductor microwave source fixedly disposed on a side wall of the cavity and configured to feed a second microwave into the cavity, wherein the semiconductor microwave source adjusts a power of the second microwave with a second power adjustment accuracy that is higher than the first power adjustment accuracy, the first microwave having a first frequency range and the second microwave having a second frequency range; and a band-stop antenna fixedly disposed on a side wall of the cavity and connected to the semiconductor microwave source to feed the second microwave into the cavity, and configured to shield the second microwave in the first frequency range, the band-stop antenna including:

an antenna configured to feed the second microwave into the cavity; and one or more of:

a filter connected to the antenna, and configured to shield the second microwave in the first frequency range; or a circulator connected to the antenna, and configured to shield the second microwave in the first frequency range.

11. The microwave cooking apparatus according to claim 10, wherein a first power range of the first microwave has a first minimum power and a first maximum power, and a second power range of the second microwave has a second minimum power and a second maximum power, and the second maximum power is between the first minimum power and the first maximum power.

12. The microwave cooking apparatus according to claim 10, wherein the first frequency range of the first microwave does not overlap the second frequency range of the second microwave.

13. The microwave cooking apparatus according to claim 12, further comprising:
a band-stop antenna fixedly disposed on a side wall of the cavity and connected with the semiconductor microwave source to feed the second microwave into the cavity, and configured to shield the second microwave in the first frequency range.

14. The microwave cooking apparatus according to claim 10, further comprising:
a waveguide fixedly disposed on a side wall of the cavity and connected to the magnetron and configured to feed the first microwave into the cavity.

15. A control method for a microwave cooking apparatus, comprising:
acquiring a target power of the microwave cooking apparatus;
analyzing the target power with respect to power parameters of a semiconductor microwave source and a magnetron in the microwave cooking apparatus to generate an analysis result;
according to the analysis result, adjusting a first power of the magnetron with a first power adjustment accuracy, and adjusting a second power of the semiconductor microwave source with a second power adjustment accuracy, so that an overall power of the microwave cooking apparatus reaches the target power, the overall power being a sum of the first power and the second power, the magnetron configured to feed a first microwave having a first frequency range and the semiconductor microwave source configured to feed a second microwave having a second frequency range; and
shielding the second microwave in the first frequency range by a band-stop antenna connected to the semiconductor microwave source, the band-stop antenna including:
an antenna configured to feed the second microwave; and
one or more of:
a filter connected to the antenna, and configured to shield the second microwave in the first frequency range; or
a circulator connected to the antenna, and configured to shield the second microwave in the first frequency range.

16. The control method according to claim 15, wherein the adjusting the first power of the magnetron with the first power adjustment accuracy and the adjusting the second power of the semiconductor microwave source with the second power adjustment accuracy includes:
in response to that the target power is not greater than a maximum power of the semiconductor microwave source, the magnetron is turned off and the second power is adjusted to the target power with the second power adjustment accuracy.

17. The control method according to claim 15, wherein the adjusting the first power of the magnetron with the first power adjustment accuracy and the adjusting the second power of the semiconductor microwave source with the second power adjustment accuracy includes:
in response to that the target power is not less than a maximum power of the magnetron, the first power is adjusted to reach the maximum power of the magnetron, and the second power is adjusted to be a difference between the target power and the maximum power of the magnetron.

18. The control method according to claim 15, wherein the adjusting the first power of the magnetron with the first power adjustment accuracy and the adjusting the second power of the semiconductor microwave source with the second power adjustment accuracy includes:
if the target power is between the a first maximum power of the magnetron and a second maximum power of the semiconductor microwave source, the first power is adjusted to reach a first preset power that is smaller than or equal to the target power, and the second power is adjusted to be a difference between the target power and the first preset power.

19. The control method according to claim 18, further comprising:
setting a plurality of preset powers between a minimum power of the magnetron and the maximum power of the magnetron, a difference between any two adjacent preset powers of the plurality of preset powers being not greater than the second maximum power of the semiconductor microwave source, the target preset power being a preset power closest to the target power among at least one preset power of the plurality of preset powers that is not greater than the target power.

* * * * *